United States Patent
Moriwaki et al.

(10) Patent No.: US 12,010,590 B2
(45) Date of Patent: Jun. 11, 2024

(54) COMMUNICATION DEVICE, COMMUNICATION METHOD, AND STORAGE MEDIUM FOR IMPLEMENTING COEXISTENCE WITH LEGACY SYSTEM

(71) Applicant: KDDI CORPORATION, Tokyo (JP)

(72) Inventors: Kazuya Moriwaki, Fujimino (JP); Masaya Shibayama, Fujimino (JP); Yasuhiro Suegara, Fujimino (JP); Takeo Ohseki, Fujimino (JP)

(73) Assignee: KDDI CORPORATION, Tokyo (JP)

(*) Notice: Subject to any disclaimer, the term of this patent is extended or adjusted under 35 U.S.C. 154(b) by 709 days.

(21) Appl. No.: 17/146,716

(22) Filed: Jan. 12, 2021

(65) Prior Publication Data
US 2021/0136534 A1 May 6, 2021

Related U.S. Application Data

(63) Continuation of application No. PCT/JP2019/030312, filed on Aug. 1, 2019.

(30) Foreign Application Priority Data

Aug. 6, 2018 (JP) .................... 2018-147732

(51) Int. Cl.
  *H04W 4/06* (2009.01)
  *H04L 5/00* (2006.01)
  *H04W 88/10* (2009.01)

(52) U.S. Cl.
  CPC .......... *H04W 4/06* (2013.01); *H04L 5/0048* (2013.01); *H04L 5/0073* (2013.01); *H04W 88/10* (2013.01)

(58) Field of Classification Search
  CPC ....... H04W 4/06; H04W 88/02; H04W 88/08; H04W 88/10; H04W 72/1215;
  (Continued)

(56) References Cited

U.S. PATENT DOCUMENTS

| | | | | |
|---|---|---|---|---|
| 10,743,299 B2* | 8/2020 | Yi | ................ | H04W 72/0453 |
| 10,944,613 B2* | 3/2021 | Yi | ................ | H04L 5/0048 |

(Continued)

FOREIGN PATENT DOCUMENTS

| JP | 2012-105176 A | 5/2012 |
|---|---|---|
| JP | 2014-510466 A | 4/2014 |

(Continued)

OTHER PUBLICATIONS

3GPP TSG RAN WG1 Meeting 90bis, R1-1718526, Prague, Oct. 9-13, 2017, Qualcomm Incorporated, "Remaining details on synchronization signal design" (Year: 2017).*

(Continued)

*Primary Examiner* — Chi H Pham
*Assistant Examiner* — Vladislav Y Agureyev
(74) *Attorney, Agent, or Firm* — Foley & Lardner LLP

(57) ABSTRACT

A communication device, which is capable of performing communication via a second wireless communication system that is different from a first wireless communication system, in a frequency band that is used by the first wireless communication system, the first wireless communication system periodically transmitting a reference signal, transmits, to a base station device of the first wireless communication system, information for operating the base station device in a mode in which the periodical transmission of the reference signal is interrupted for a predetermined period, and performs communication involving a predetermined signal of the second wireless communication system while the base station device of the first wireless communication system is operating in the mode.

12 Claims, 7 Drawing Sheets

(58) Field of Classification Search
CPC ..... H04W 76/16; H04W 92/20; H04W 16/14; H04L 5/0048; H04L 5/0073; Y02D 30/70
See application file for complete search history.

(56) References Cited

U.S. PATENT DOCUMENTS

| | | | | |
|---|---|---|---|---|
| 11,277,785 | B2* | 3/2022 | Yang | H04W 56/001 |
| 11,523,420 | B2* | 12/2022 | Dinan | H04L 1/1861 |
| 11,540,281 | B2* | 12/2022 | Heiser | H04W 72/20 |
| 11,558,227 | B2* | 1/2023 | Kazmi | H04L 5/001 |
| 11,570,769 | B2* | 1/2023 | Dinan | H04L 1/00 |
| 11,627,470 | B1* | 4/2023 | Gronstad | H04W 16/10 370/329 |
| 11,638,289 | B2* | 4/2023 | John Wilson | H04L 1/0026 370/329 |
| 11,647,505 | B2* | 5/2023 | Lin | H04L 27/2605 370/329 |
| 11,696,287 | B2* | 7/2023 | Takeda | H04L 5/0042 370/330 |
| 11,722,968 | B2* | 8/2023 | Liu | H04W 52/32 455/522 |
| 11,729,754 | B2* | 8/2023 | Sun | H04W 56/0015 370/281 |
| 2012/0207025 | A1* | 8/2012 | Barbieri | H04L 1/20 370/252 |
| 2013/0301528 | A1* | 11/2013 | Takahashi | H04W 72/541 370/328 |
| 2018/0295637 | A1* | 10/2018 | Manolakos | H04W 72/54 |
| 2018/0316472 | A1* | 11/2018 | John Wilson | H04L 5/0053 |
| 2019/0082395 | A1* | 3/2019 | Malladi | H04W 72/0473 |
| 2019/0089498 | A1* | 3/2019 | Pelletier | H04L 5/005 |
| 2019/0116007 | A1* | 4/2019 | Yi | H04W 72/0453 |
| 2019/0281621 | A1* | 9/2019 | Noh | H04L 5/0094 |
| 2019/0357264 | A1* | 11/2019 | Yi | H04L 1/1819 |
| 2020/0067661 | A1* | 2/2020 | Siomina | G01S 5/0036 |
| 2020/0099560 | A1* | 3/2020 | Li | H04W 72/0453 |
| 2020/0120668 | A1* | 4/2020 | Lee | H04W 72/542 |
| 2020/0136763 | A1* | 4/2020 | Lee | H04L 1/0031 |
| 2020/0169958 | A1* | 5/2020 | Lee | H04W 52/146 |
| 2020/0177255 | A1* | 6/2020 | Lee | H04L 5/0082 |
| 2020/0221395 | A1* | 7/2020 | Lee | H04W 52/146 |
| 2020/0359403 | A1* | 11/2020 | Lee | H04W 72/21 |
| 2020/0374911 | A1* | 11/2020 | Lee | H04L 5/0007 |
| 2020/0389859 | A1* | 12/2020 | Lee | H04W 52/54 |
| 2021/0135813 | A1* | 5/2021 | Werner | H04L 5/0048 |
| 2021/0153245 | A1* | 5/2021 | Tooher | H04W 74/008 |
| 2021/0392683 | A1* | 12/2021 | Awadin | H04B 7/088 |
| 2022/0182208 | A1* | 6/2022 | Yu | H04L 5/0053 |
| 2022/0271883 | A1* | 8/2022 | Bin Sediq | H04W 72/1215 |

FOREIGN PATENT DOCUMENTS

| | | | | |
|---|---|---|---|---|
| WO | WO-2012063932 A1 | * | 5/2012 | ............ H04W 24/10 |
| WO | WO-2017/033435 A1 | | 3/2017 | |
| WO | WO-2017/173133 A1 | | 10/2017 | |
| WO | WO-2017173133 A1 | * | 10/2017 | ............ H04L 5/003 |
| WO | WO-2019235980 A1 | * | 12/2019 | ........... H04L 5/0048 |
| WO | WO-2019240639 A1 | * | 12/2019 | ........... H04L 5/0048 |

OTHER PUBLICATIONS

NTT Docomo, Inc., "Work Item on New Radio (NR) Access Technology", 3GPP TSG RAN Meeting #77 RP-172115 (Revision of RP-172109), Sep. 2017, 11 pages.

Ericsson, Nokia, Nokia Shanghai Bell, At&T, "LTE-NR, resource allocation coordination over X2" [online], 3GPP TSG, RAN WG3 Meeting #99 R3-181284, Mar. 2018, 7 pages.

Samsung, "RRC signalling to support LTE+NR Co-existence" [online], 3GPP TSG RAN WG2 #99Bis Meeting R2-1711819, Oct. 2017, 7 pages.

Huawei, HiSilicon, "Coexistence of NR DL and LTE" [online], 3GPP TSG RAN WG1 Meeting #88 R1-1703559, Feb. 2017, 8 pages.

* cited by examiner

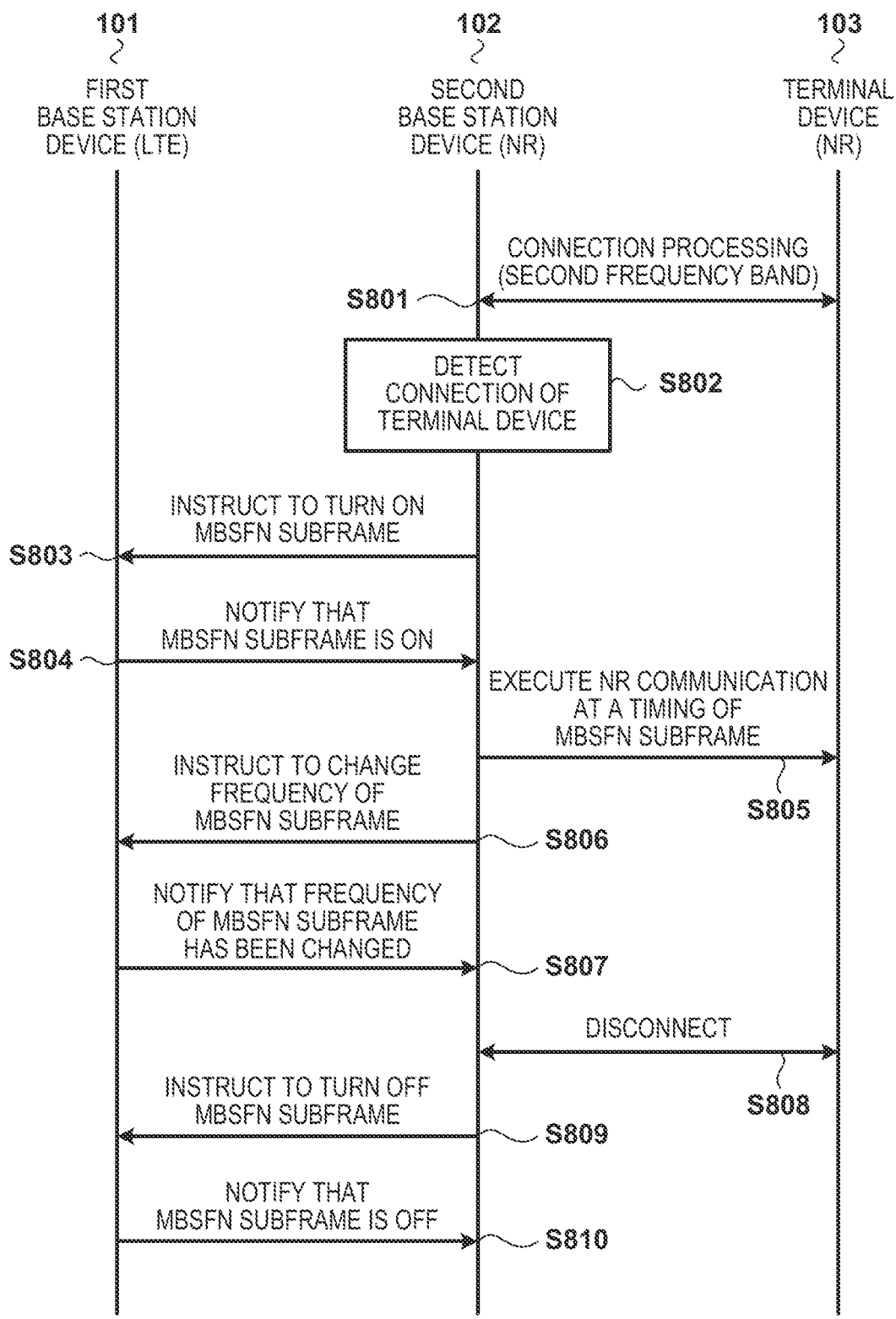

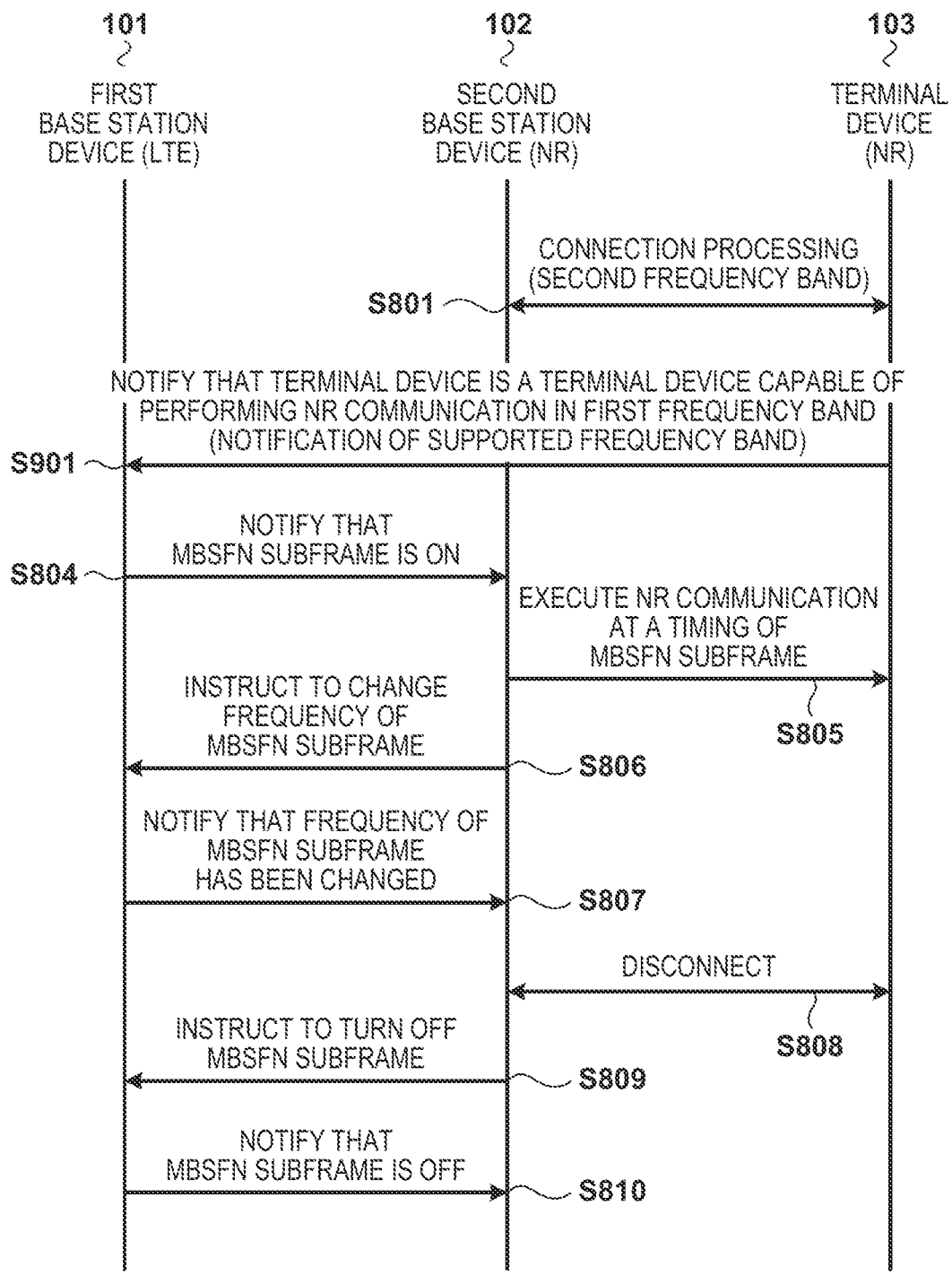

COMMUNICATION DEVICE, COMMUNICATION METHOD, AND STORAGE MEDIUM FOR IMPLEMENTING COEXISTENCE WITH LEGACY SYSTEM

CROSS-REFERENCE TO RELATED APPLICATION(S)

This application is a continuation of International Patent Application No. PCT/JP2019/030312 filed on Aug. 1, 2019, which claims priority to and the benefit of Japanese Patent Application No. 2018-147732 filed Aug. 6, 2018, the entire disclosures of which are incorporated herein by reference.

BACKGROUND OF THE INVENTION

Field of the Invention

The present invention relates to a communication device, a communication method, and a storage medium, and specifically relates to a technique for reducing interference between wireless communication systems.

Description of the Related Art

Currently, research is conducted on New Radio Access Technology (NR) as a 5-th generation cellular communication technique. In this research, further research is conducted on operating NR in an existing frequency band that is used by Long Term Evolution (LTE) (see 3GPP, RP-172115, September 2017).

In an environment in which LTE and NR coexist, it is important to prevent NR from interfering with communication of LTE, which is a previous-generation communication system. Meanwhile, in LTE, reference signals are allocated in a dispersed manner to the entire system band due to its specification. Thus, when predetermined signals such as synchronization signals for NR are transmitted according to the specification, they interfere with the LTE reference signals.

Furthermore, it is also possible that such predetermined signals are transmitted in the form of being short in the time direction (wide in the frequency direction) at timings shifted from transmission timings of LTE reference signals, in order to prevent interference with the reference signals. However, the signals in such a mode cannot ensure orthogonality relative to OFDM (orthogonal frequency-division multiplexing) signals for transmission of LTE data that is transmitted at the same timings therewith, and thus they may be an interference source for the signals. In this manner, in communication via a new-generation wireless communication system, it is necessary to consider the influence on signals that are periodically sent, such as reference signals in a previous-generation wireless communication system.

SUMMARY OF THE INVENTION

The present invention provides a technique for reducing the influence of transmission of signals in a second wireless communication system in a new generation, on a first wireless communication system in a previous generation.

An aspect of the present invention is directed to a communication device capable of performing communication via a second wireless communication system that is different from a first wireless communication system, in a frequency band that is used by the first wireless communication system, the first wireless communication system periodically transmitting a reference signal, comprising: a communication circuit; and a controller that controls the communication circuit, wherein the controller controls the communication circuit to transmit, to a base station device of the first wireless communication system, information for operating the base station device in a mode in which the periodical transmission of the reference signal is interrupted for a predetermined period, and controls the communication circuit to perform communication involving a predetermined signal of the second wireless communication system while the base station device of the first wireless communication system is operating in the mode.

Another aspect of the present invention is directed to a communication device capable of performing communication via a second wireless communication system that is different from a first wireless communication system, in a frequency band that is used by the first wireless communication system, the first wireless communication system periodically transmitting a reference signal, wherein the communication device performs communication via the second wireless communication system, while a base station device of the first wireless communication system is operating in a mode in which the periodical transmission of the reference signal is interrupted for a predetermined period.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 8 is a diagram showing a first example of the flow of processing that is performed in the wireless communication system.

FIG. 9 is a diagram showing a second example of the flow of processing that is performed in the wireless communication system.

DESCRIPTION OF THE EMBODIMENTS

Figure 1:
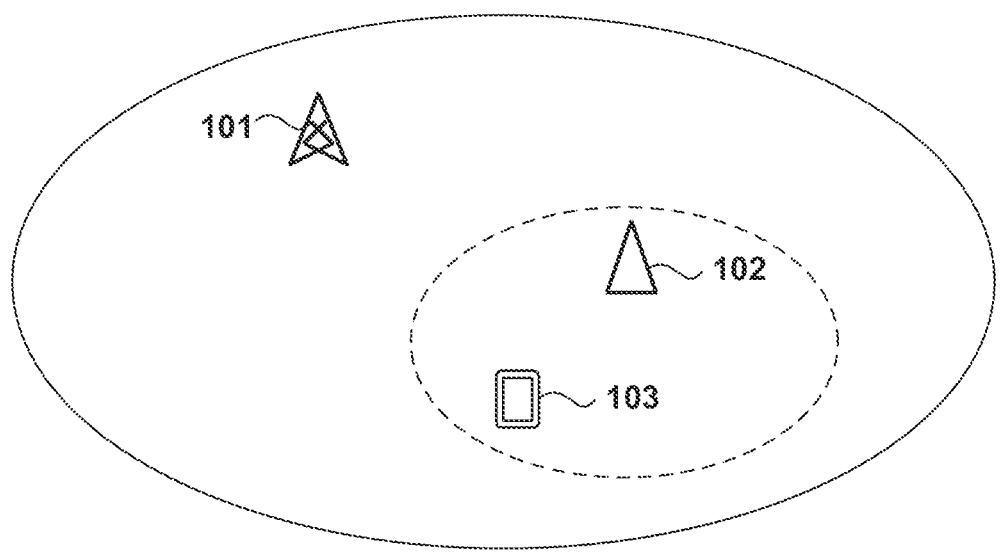
FIG. 1 is a diagram showing a configuration example of a wireless communication system.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

A configuration example of a communication system according to this embodiment is shown in FIG. 1. FIG. 1 shows a first base station device 101 for a first wireless communication system, and a second base station device 102 and a terminal device 103 for a second wireless communication system. The first wireless communication system uses a first frequency band. In this embodiment, it is assumed that the first wireless communication system conforms to the Long Term Evolution (LTE) standard, which is a 4-th generation (4G) cellular communication standard. Furthermore, the second wireless communication system can use a first frequency band, as well as a second frequency band that is different from the first frequency band. In this embodiment, it is assumed that the second wireless communication system conforms to the New Radio Access Technology (NR) standard, which is a 5-th generation (5G) cellular communication standard. That is to say, in the first frequency band, a coexistence environment is provided in which communication conforming to the NR standard is performed as well while communication conforming to the LTE standard is performed. In the description below, it is assumed that the terminal device 103 performs communication according to the NR standard, but the terminal device 103 may perform communication through connection to the first base station device 101 according to the LTE standard, in addition to or instead of the connection to the second base station device 102.

Although FIG. 1 illustrates a case in which one first base station device 101 conforming to the LTE standard, and one second base station device 102 and one terminal device 103 conforming to the NR standard are arranged, it will be appreciated that there may be a large number of such devices. Furthermore, although FIG. 1 illustrates a case in which a cell deployed by the first base station device 101 includes a cell deployed by the second base station device 102, there is no limitation to this, and it is also possible to apply a configuration in which these cells partially overlap each other. Moreover, although FIG. 1 shows the first base station device 101 and the second base station device 102 as different facilities that are located at different positions, these devices may be located at the same position. For example, the LTE base station device and the NR base station device may be located side by side in one area. Furthermore, the first base station device 101 and the second base station device 102 form two or more beams, and can communicate with terminal devices in cells (sectors) deployed by the beams.

Figure 2:
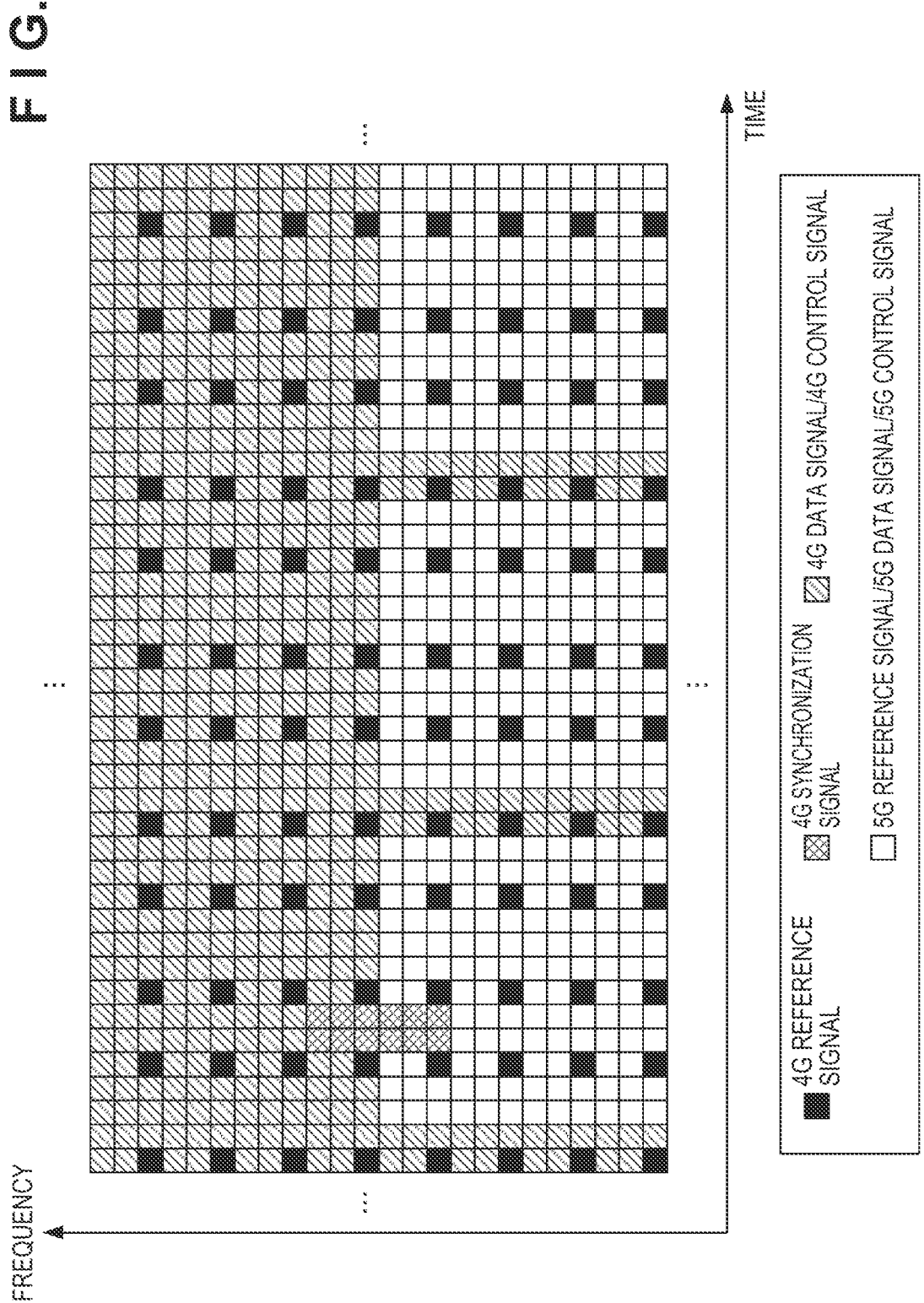
FIG. 2 is a diagram briefly illustrating an environment in which LTE and NR coexist.

Hereinafter, an environment in which the LTE standard and the NR standard coexist will be described with reference to FIG. 2. In this coexistence environment, communication of LTE, which is a legacy system is performed on a priority basis, and communication of NR is performed using radio resource that is not used in the LTE. FIG. 2 shows resource arranged as two resource blocks in the frequency direction and six resource blocks in the time direction, for the sake of description. One rectangular region in FIG. 2 indicates 1 subcarrier×1 OFDM symbol in the LTE, and this unit is referred to as a resource element. One resource block is constituted by 12 subcarriers×7 OFDM symbols, and, in each resource block, a predetermined number of resource elements are periodically allocated at predetermined frequency positions, in order to transmit a reference signal. Furthermore, resource is allocated to a terminal device in units of two resource blocks in the time direction, and a control signal for 1 to 3 OFDM symbols is allocated to this unit. Moreover, a synchronization signal is allocated in a constant cycle.

In LTE, a synchronization signal, a reference signal, and a control signal are transmitted even in resource blocks in which no user data is transmitted. In particular, a reference signal is allocated in a finely dispersed manner along the frequency axis to the entire system frequency band, and is periodically transmitted at short time intervals. Accordingly, when an NR synchronization signal is transmitted in this state, interference with the reference signal occurs. Meanwhile, it is possible to transmit an NR synchronization signal at a timing at which no reference signal is transmitted, by making the NR synchronization signal short in the time direction (wide in the frequency direction). However, in this case, the synchronization signal cannot ensure orthogonality relative to an LTE data signal on the frequency axis, and thus it may interfere with the LTE data signal.

Thus, in this embodiment, an NR communication device (the second base station device 102, the terminal device 103, or another network node) transmits, to an LTE base station device (the first base station device 101), a signal for interrupting the periodical transmission of the reference signal for a predetermined period. For example, when the second base station device 102 is connected in the second frequency band to the terminal device 103 capable of performing NR communication in the first frequency band as well, the second base station device 102 transmits such a signal to the first base station device 101 in order to establish synchronization with the terminal device 103 in the first frequency band. This signal may contain, for example, information for instructing the first base station device 101 to shift to a mode in which a multimedia broadcast single frequency network (MBSFN) subframe is on. When the MBSFN subframe is on, a reference signal is transmitted together with the control information in the control region in the MBSFN subframe, but no reference signal is transmitted thereafter. Furthermore, the terminal device 103 transmits information of that terminal device 103 to the first base station device 101 in response to establishment of the connection to the second base station device 102 in the second frequency band (e.g., by transmitting a signal conforming to the LTE standard in the first frequency band). This information is, for example, information indicating that communication according to the NR standard can be performed in the first frequency band (the frequency band that is used by LTE), or information indicating a combination of an available frequency band and an available communication standard, or the like. This information may be any information for enabling the first base station device 101 to recognize that coexistence with NR in the first frequency band is to be implemented in an area deployed by the first base station device 101. Accordingly, the first base station device 101 recognizes that an NR synchronization signal needs to be transmitted, and recognizes that it should operate such that the periodical transmission of the reference signal is interrupted for a predetermined period. Then, the first base station device 101 can operate such that the transmission of the reference signal is interrupted for a period corresponding to one subframe, by shifting to a mode in which the MBSFN subframe is on, for example.

At that time, in the case in which the periodical transmission of the reference signal is interrupted, the first base station device 101 can interrupt transmission of a data signal for a predetermined period during which the periodical transmission of the reference signal is interrupted. An instruction to interrupt the transmission of a data signal may be explicitly given from the NR communication device, or it may be determined by the first base station device 101 that an instruction to interrupt the transmission of a data signal is implicitly given, based on the instruction to interrupt the periodical transmission of the reference signal.

Furthermore, the NR communication device may transmit, to the first base station device 101, an instruction indicating a timing (a subframe) to interrupt the transmission of the reference signal. In this case, the first base station device 101 may shift to a mode in which an MBSFN subframe is transmitted in a designated subframe, for example. It is also possible that the first base station device 101 decides on a timing to interrupt the transmission of the reference signal, and notifies the second base station device 102 of the timing. This notification may be a notification that is made as a result of the first base station device 101 autonomously deciding on a timing to interrupt the transmission of the reference signal when no instruction is given from the NR communication device, or a notification as to whether or not to accept the instruction regarding the timing from the NR communication device. With this notification, the second base station device 102 can decide a timing to transmit a predetermined signal such as a synchronization signal. For example, the first base station device 101 may shift to a mode in which the transmission of the LTE reference signal is interrupted (e.g., a mode in which an MBSFN subframe is transmitted), in response to the transmission cycle of the NR synchronization signal. In this case, the second base station device 102 may give the first base station device 101 an instruction indicating a timing (e.g., the subframe number of one subframe) to start the interruption of the transmission of the reference signal and information on the cycle to interrupt the transmission of the reference signal thereafter, as information indicating a timing to interrupt the transmission of the reference signal. Furthermore, the first base station device 101 may specify the cycle, for example, based on the NR specification, without acquiring the information on the cycle from the second base station device 102.

Figure 3:
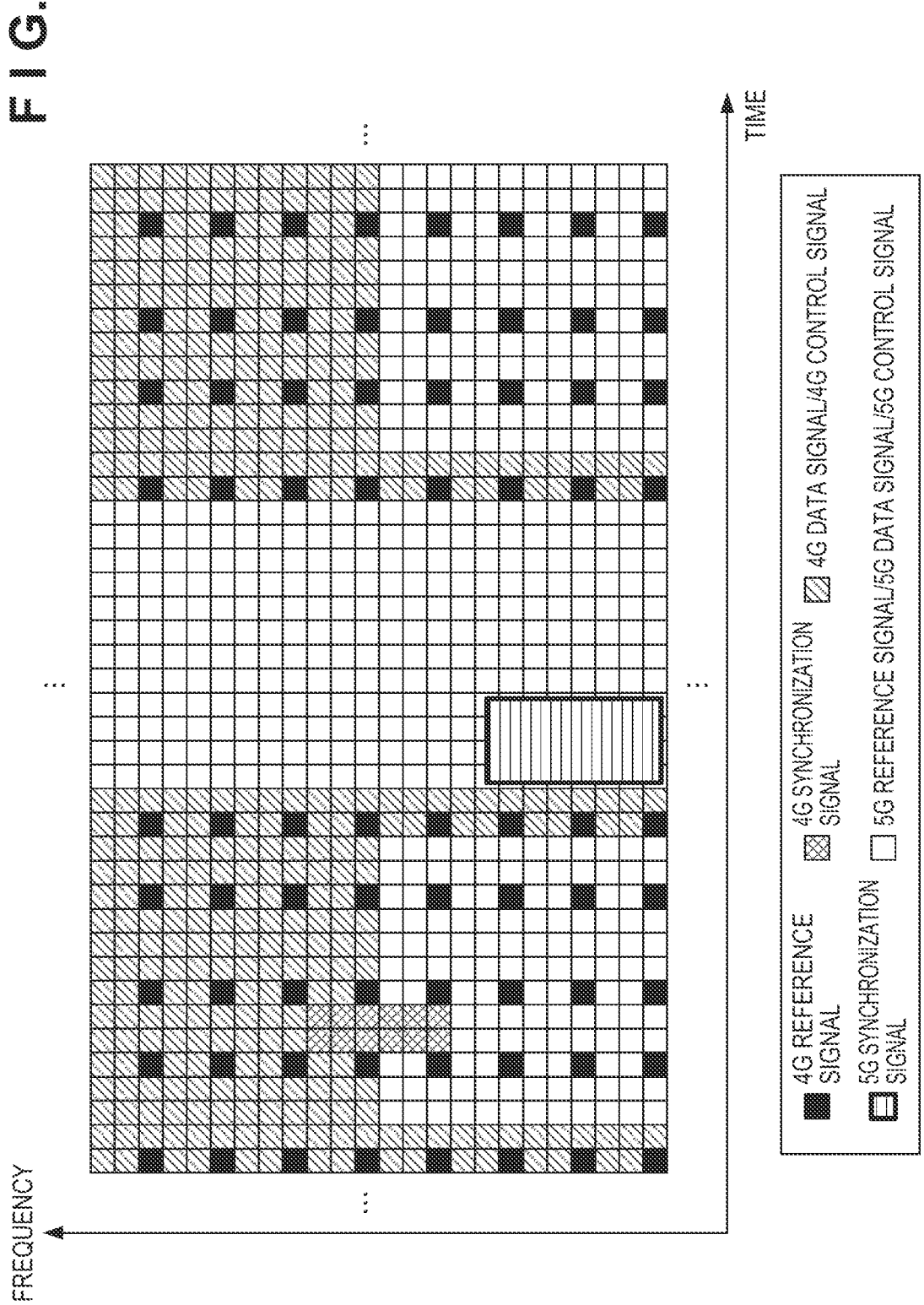
FIG. 3 is a diagram briefly illustrating an environment in which LTE and NR coexist, in the case in which the procedure according to an embodiment is applied.

In this manner, a time section during which no LTE reference signal is transmitted is generated due to the signal from the NR communication device, and thus the second base station device 102 can transmit a predetermined signal such as a synchronization signal during that time section. FIG. 3 shows this state. For example, when the first base station device 101 shifts to a mode in which the MBSFN subframe is on, in the radio resource corresponding to one subframe (corresponding to 14 resource elements in the time direction), a reference signal is transmitted as well in a time zone during which a control signal is transmitted, but no reference signal is transmitted in subsequent time sections. Accordingly, even in the case in which the second base station device 102 transmits a predetermined signal such as an NR synchronization signal, it does not interfere with the LTE reference signal. The predetermined signal in this case is a synchronization signal as an example, but, in the situation in which the LTE reference signal is transmitted, the predetermined signal may be any signal that may interference with that reference signal or that may interference with another LTE signal when the interference with the reference signal is avoided.

The second base station device 102 may allocate radio resource other than the radio resource for transmitting synchronization signals, to transmission of NR user data. In this case, no LTE reference signal is transmitted, and thus the radio resource for the reference signal also can be used for NR communication. Accordingly, it is possible to ensure more radio resource that can be used for NR. The second base station device 102 may increase the frequency for generating the period during which the first base station device 101 transmits no reference signal, for example, in the case in which the number of NR terminal devices capable of operating in the first frequency band increases. Furthermore, in NR, if the second base station device 102 forms a plurality of beams, a synchronization signal regarding two beams can be transmitted in one subframe. Accordingly, the second base station device 102 may decide the frequency for generating the period during which the first base station device 101 transmits no reference signal, according to the total number of beams that are used (that may be used) by terminal devices capable of performing communication in the first frequency band. The second base station device 102 may transmit, to the first base station device 101, information indicating the frequency for shifting the first base station device 101 to a mode in which the transmission of the reference signal is interrupted (e.g., the frequency for turning the MBSFN subframe on), based on the number of NR terminal devices that are connected and capable of operating in the first frequency band, or the number of beams. Then, the first base station device 101 may accept or reject the instruction to interrupt the reference signal at the frequency indicated by the information, for example, according to the number of LTE terminal devices that are connected, and the like. The first base station device 101 may notify the second base station device 102 of information indicating whether or not to accept the frequency settings. Accordingly, the first base station device 101 can decide whether or not to accept the instruction to interrupt the transmission of the reference signal at a high frequency, in consideration of the situation on the LTE side, and the second base station device 102 can ensure opportunities to transmit NR signals, while suppressing the influence on the LTE communication.

Furthermore, in the case in which the number of NR terminal devices that are connected and capable of operating in the first frequency band becomes zero, that is, in the case in which no NR communication will be performed in the first frequency band, the second base station device 102 does not need to transmit a predetermined signal such as a synchronization signal. Accordingly, for example, if settings are made such that the first base station device 101 does not periodically transmit a reference signal, in response to cancellation of connection to all NR terminal devices capable of operating in the first frequency band, the second base station device 102 may instruct the first base station device 101 not to shift to a mode in which the transmission of the reference signal is interrupted after the cancellation. Accordingly, it is possible to prevent the first base station device 101 from unnecessarily shifting to a state for interrupting the transmission of the LTE reference signal, in a region in which there is no terminal device capable of operating in the first frequency band.

The first base station device 101 and the second base station device 102 communicate with each other, for example, using an Xn interface. Furthermore, information is transmitted from the terminal device 103 to the first base station device 101 according to the LTE standard using a first frequency band. However, they are merely an example, and it is possible to use any interface and any network, as long as the information as described above is transmitted and received.

In the description below, a configuration example of a base station device and a terminal device that perform the above-described processing and an example of the processing flow will be described.

Hardware Configuration Example

Figure 4:
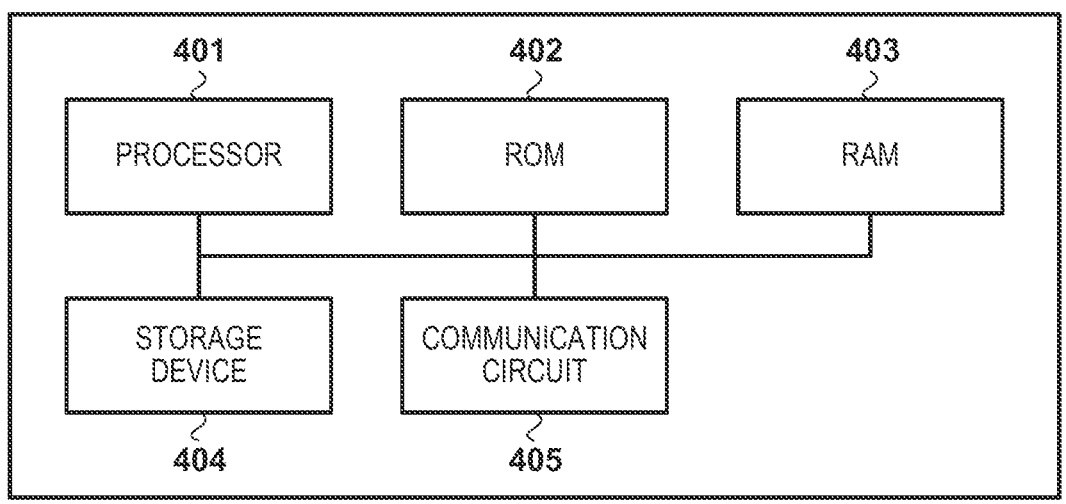
FIG. 4 is a diagram showing a hardware configuration example of a communication device.

FIG. 4 shows a configuration example of the first base station device 101, the second base station device 102, and the terminal device 103 (these devices are collectively referred to as a "communication device" in this example) according to this embodiment. The communication device in an example includes a processor 401, a ROM 402, a RAM 403, a storage device 404, and a communication circuit 405. The processor 401 is a computer including one or more processing circuits such as a general-purpose CPU (central processing unit) or an ASIC (application specific integrated circuit), and executes the entire processing of the communication device or each processing described above, by reading and executing programs stored in the ROM 402 or the storage device 404. The ROM 402 is a read-only memory for storing information such as programs or various parameters regarding processing that is performed by the communication device. The RAM 403 functions as a work space when the processor 401 executes a program, and is a random access memory for temporarily storing information. The storage device 404 is constituted by a detachable external storage device or the like, for example. The communication circuit 405 is constituted by a wired or wireless communication circuit, for example. The communication circuit 405 of the terminal device 103 includes an NR baseband circuit, an RF circuit, and the like, and an antenna, for example, and conforms to both of the first frequency band for LTE and the second frequency band for NR. The terminal device 103 may include an LTE baseband circuit, an RF circuit, and the like. The communication circuit 405 of the first base station device 101 realizes an interface for performing (wired or wireless) communication with the second base station device 102 and an LTE wireless communication interface, for example. Furthermore, the second base station device 102 realizes an interface for performing (wired or wireless) communication with the first base station device 101 and an NR wireless communication interface, for example. Although FIG. 4 shows one communication circuit 405, the communication device may include a plurality of communication circuits.

Functional Configuration Example

Figure 5:
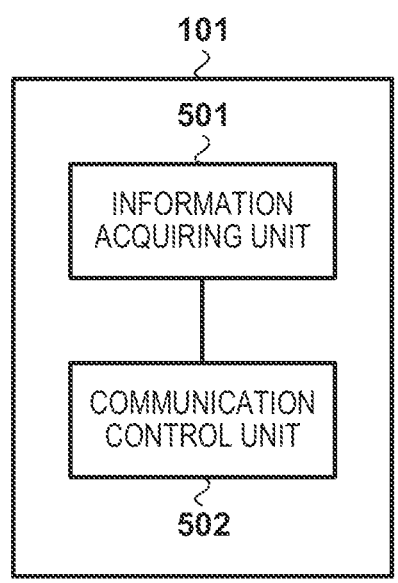
FIG. 5 is a diagram showing a functional configuration example of a first base station device.

FIG. 5 shows a functional configuration example of the first base station device 101. The first base station device 101 includes an information acquiring unit 501 and a communication control unit 502, for example. It is natural that the first base station device 101 also has the functions of a generally used LTE base station device, but a description of these functions will be omitted for the sake of description.

The information acquiring unit 501 acquires predetermined information, for example, using the Xn interface from the second base station device 102, or through a first frequency band that is used by LTE from the terminal device 103 capable of performing NR communication in the first frequency band.

The communication control unit 502 performs communication control that performs communication in a mode in which the periodical transmission of the reference signal is interrupted for a predetermined period, in response to acquisition of the predetermined information. The first base station device 101 interrupts the transmission of the reference signal, for example, when the mode is shifted to a mode in which the MBSFN subframe is on, in response to receiving of information from the second base station device 102 indicating that the MBSFN subframe should be turned on. Note that the first base station device 101 transmits control information and a reference signal in the control region in the MBSFN subframe at this time, but may be in a non-signal state in which neither a reference signal nor user data is transmitted in subsequent regions.

Furthermore, the first base station device 101 may interrupt the transmission of the reference signal, in response to receiving of information indicating that the terminal device 103 that has established connection to the second base station device 102 can conform to NR communication in the first frequency band, from the terminal device 103. The first base station device 101 may receive information for giving an instruction to interrupt transmission of a reference signal, such as information indicating that the MBSFN subframe should be turned on, from the terminal device 103. Upon recognizing that it is a state in which the reference signal should be interrupted, the first base station device 101 accordingly shares information indicating a timing and a cycle to interrupt the transmission of the reference signal and the like, with the second base station device 102. Accordingly, the second base station device 102 can transmit a predetermined signal such as an NR synchronization signal while the transmission of the reference signal is interrupted.

For example, the first base station device 101 may receive request information regarding a timing, a frequency, and a cycle to interrupt the transmission of the reference signal and the like, from the second base station device 102. In this case, the first base station device 101 may determine whether or not to accept the request, and notify the second base station device 102 of the determination result information. Furthermore, the first base station device 101 turns the MBSFN subframe off, for example, in response to receiving of information indicating that the interruption of the transmission of the reference signal should be ended, from the second base station device 102. In this manner, the first base station device 101 performs control so as to interrupt the periodical transmission of the reference signal, in order to allow a predetermined signal such as an NR synchronization signal to be transmitted, based on predetermined information from a communication device capable of performing NR communication in the first frequency band that is used by LTE.

Figure 6:
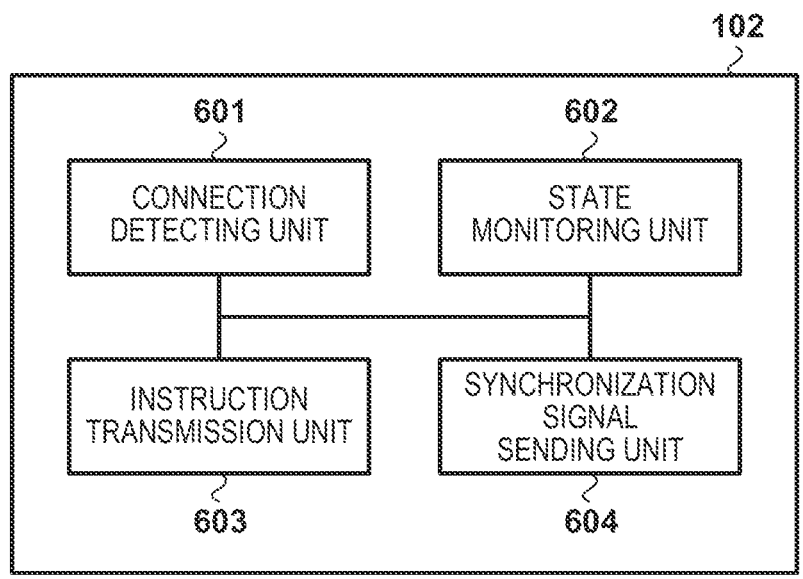
FIG. 6 is a diagram showing a functional configuration example of a second base station device.

FIG. 6 shows a functional configuration example of the second base station device 102. The second base station device 102 includes a connection detecting unit 601, a state monitoring unit 602, an instruction transmitting unit 603, and a synchronization signal sending unit 604, for example. It is natural that the second base station device 101 also has the functions of a generally used NR base station device, but a description of these functions will be omitted for the sake of description.

The connection detecting unit 601 detects that a specific terminal device capable of performing NR communication in the first frequency band that is used by LTE is connected to the second base station device 102 in the second frequency band. Furthermore, when connection to the above-mentioned specific terminal device is canceled, the connection detecting unit 601 can detect the cancellation, and determine whether or not connection to all specific terminal devices is canceled. In the case in which the connection detecting unit 601 detects that the above-mentioned specific terminal device has been connected in the second frequency band, the instruction transmitting unit 603 transmits predetermined information containing an instruction to operate the first base station device 101 so as to interrupt the transmission of the reference signal for a predetermined period, to the first base station device 101. This instruction may contain information for instructing a cycle to interrupt the transmission of the reference signal, corresponding to a cycle in which the second base station device 102 transmits a predetermined signal such as a synchronization signal in the first frequency band, for example. The first base station device 101 interrupts the transmission of the reference signal, for example, in the designated cycle, in response to the instruction. Furthermore, if the connection detecting unit 601 detects that connection to all specific terminal devices to the second base station device 102 is canceled, the instruction transmitting unit 603 transmits an instruction signal to the first base station device 101 so as to interrupt the transmission of the reference signal.

The state monitoring unit 602 monitors a connection state such as the number of terminal devices that are connected to the second base station device 102 and capable of performing NR communication in the first frequency band, the NR throughput request amount, the number of beams that are being used by the second base station device 102, and the like, for example. In response to the monitoring result, for example, if the number of terminal devices that are connected is more than a predetermined number, if the NR throughput request is more than a predetermined value, or if the number of beams that are being used increases, the instruction transmitting unit 603 transmits a signal for instructing the first base station device 101 to increase the frequency for interrupting the transmission of the reference signal. Furthermore, for example, if the number of terminal devices that are connected is at most the predetermined number or if the number of beams that are being used decreases, the instruction transmitting unit 603 transmits a signal for instructing the first base station device 101 to decrease the frequency for interrupting the transmission of the reference signal. In this manner, the second base station device 102 can cause the state monitoring unit 602 to monitor the connection state at that point in time, and perform control such that the first base station device 101 interrupts the transmission of the reference signal at a proper frequency.

The synchronization signal sending unit 604 sends an NR synchronization signal in the first frequency band, while the first base station device 101 interrupts the transmission of the reference signal. Although a case will be described hereinafter in which the second base station device 102 sends a synchronization signal, and the terminal device 103 establishes synchronization using the synchronization signal, it is also possible that other predetermined signals are transmitted. Furthermore, in a period during which the first base station device 101 transmits neither a reference signal nor a data signal, NR communication can be performed without considering the interference on LTE, and thus NR data signals may be transmitted. Accordingly, the second base station device 102 may allocate resource for transmitting NR data.

Figure 7:
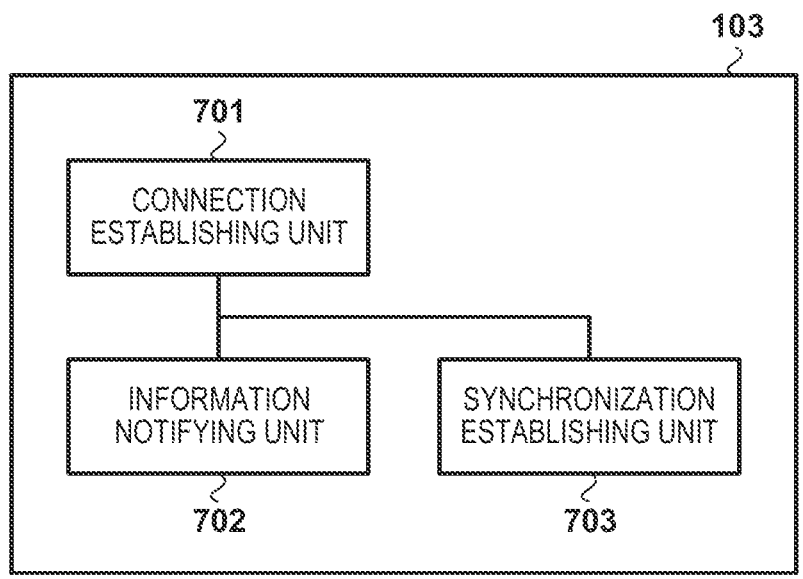
FIG. 7 is a diagram showing a functional configuration example of a terminal device.

FIG. 7 shows a functional configuration example of the terminal device 103. The terminal device 103 includes a connection establishing unit 701, an information notifying unit 702, and a synchronization establishing unit 703, for example. The terminal device 103 has the functions of a terminal device capable of performing NR communication not only in the second frequency band that is allocated to NR but also in the first frequency band that is used by LTE. Furthermore, the terminal device 103 also has the functions of a generally used terminal other than those described above, but a description of these functions will be omitted for the sake of description. The connection establishing unit 701 performs processing for establishing connection to the second base station device 102. It is also possible that the connection establishing unit 701 first establishes connection to the second base station device 102 in the second frequency band for NR, and then performs processing for performing NR communication also in the first frequency band if it establishes synchronization with the second base station device 102 in the first frequency band.

In response to establishment of the connection to the second base station device 102 in the second frequency band, the information notifying unit 702 notifies the first base station device 101 of that the terminal device 103 supports NR communication in the first frequency band. The information notifying unit 702 may notify the first base station device 101 of information for giving an instruction to periodically interrupt the reference signal. Furthermore, if both of the second base station device 102 and the terminal device 103 are capable of performing NR communication in the first frequency band, the information notifying unit 702 may make a notification of that effect. In the case in which the second base station device 102 transmits, to the first base station device 101, information for giving an instruction to periodically interrupt the reference signal, the terminal device 103 does not have to make a notification of such information, and, in this case, the terminal device 103 does not have to include the information notifying unit 702. Furthermore, for example, the information notifying unit 702 does not have to make a notification of such information in the case in which there is a period in which the transmission of the reference signal in the first frequency band is interrupted due to an action of an information notifying unit 702 of another terminal device, and a synchronization signal is transmitted from the second base station device 102 during that period. That is to say, after establishing connection to the second base station device 102 in the second frequency band, the terminal device 103 may observe whether or not there is a period in which the first base station device 101 interrupts the transmission of the reference signal in the first frequency band and the second base station device 102 sends a synchronization signal, and determine whether or not to cause the information notifying unit 702 to make a notification of information as described above, according to the observation result.

The synchronization establishing unit 703 establishes synchronization with the second base station device 102 in the first frequency band, using the synchronization signal transmitted by the synchronization signal sending unit 604 of the second base station device 102, for example, while the first base station device 101 interrupts the transmission of the reference signal based on the information transmitted by the information notifying unit 702 or the instruction transmitting unit 603 of the second base station device 102. Accordingly, the terminal device 103 can perform NR communication with the second base station device 102 in the first frequency band that is used by LTE.

Processing Flow

Next, the flow of processing that is performed by the communication system will be described. In the following processing example, it is assumed that the first base station device 101 is an LTE base station device, and processing for shifting to a mode in which the MBSFN subframe is on is performed as the processing for interrupting the reference signal. However, this is merely an example, and any processing may be performed, as long as the reference signal transmission that is periodical and dispersed on the frequency axis can be interrupted.

FIG. 8 shows the flow of a first processing example. In this processing, upon detecting that NR connection to the terminal device 103 supporting NR communication in the first frequency band has been established in the second frequency band (S801, S802), the second base station device 102 causes the first base station device 101 to interrupt the transmission of the reference signal in order to establish synchronization with the terminal device 103 in the first frequency band. In this example, the second base station device 102 transmits a message for shifting to a mode in which the MBSFN subframe is on, for example, using the Xn interface, to the first base station device 101 (S803). This message may contain information designating a timing (subframe number, etc.) to turn the MBSFN subframe on, for example. The "MBSFN subframe is on" means a non-signal state in which a reference signal is not transmitted either in regions other than the control region in the MBSFN subframe. Upon receiving this message, the first base station device 101 shifts to a mode in which the MBSFN subframe is on (e.g., at the timing designated by the message in S803 or the timing autonomously decided on by the first base station device 101), and notifies the second base station device 102 of that the mode has been changed, for example, using the Xn interface (S804). At this time, the first base station device 101 may notify the second base station device 102 of information indicating the timing to turn the MBSFN subframe on. Furthermore, the first base station device 101 may transmit a message to reject the shift to the mode in which the MBSFN subframe is on, for example, in a state in which there are a large number of terminal devices that are performing LTE communication. Accordingly, it is possible to prevent the radio resource that can be used in LTE from decreasing.

Then, the second base station device 102 transmits an NR synchronization signal or performs other NR communication at the timing of the MBSFN subframe (S805). Since the MBSFN subframe is periodically turned on, the second base station device 102 can establish NR synchronization with the terminal device 103 capable of conforming to NR communication in the first frequency band, at that timing. In the case in which the number of terminal devices 103 is more than a predetermined number, the case in which the NR throughput request is more than a predetermined value, or the case in which the number of beams that are being used in the first frequency band increases, it is useful to increase the frequency for turning the MBSFN subframe on.

Accordingly, the second base station device 102 may transmit a request to increase the frequency for turning the MBSFN subframe on, for example, using the Xn interface, to the first base station device 101 (S806). Upon determining to receive this request, the first base station device 101 notifies the second base station device 102 of that the frequency for turning the MBSFN subframe on has been changed (and a timing to turn the MBSFN subframe on, as necessary), for example, using the Xn interface (S807). Accordingly, the frequency of the MBSFN subframe can be changed, and thus it is possible to perform NR communication at a proper frequency according to an increase in the number of terminal devices 103, an increase in the request throughput, an increase in the number of beams that are being used, and the like.

Then, if connection to all terminal devices 103 capable of performing NR communication in the first frequency band is canceled (S808), the second base station device 102 determines that the transmission of synchronization signals in the first frequency band is no more necessary, and transmits an instruction message to turn the MBSFN subframe off, for example, using the Xn interface, to the first base station device 101 (S809). Upon receiving this message, the first base station device 101 turns the MBSFN subframe off, ends the settings of a time section during which no reference signal is transmitted for NR communication, and transmits a message for making a notification of that effect, for example, using the Xn interface, to the second base station device 102 (S810).

In the above-described processing, an example was described in which the second base station device 102 transmits an instruction to turn the MBSFN subframe on, to the first base station device 101, upon establishing connection to the terminal device 103, but there is no limitation to this. For example, it is also possible that the first base station device 101 operates so as to turn the MBSFN subframe on (i.e., to interrupt the transmission of the reference signal for a predetermined period) in response to the terminal device 103 capable of conforming to both of LTE and NR establishing NR connection. FIG. 9 shows an example of the processing flow in this case. In FIG. 9, if the terminal device 103 supporting NR communication in the first frequency band has established NR connection to the second base station device 102 in the second frequency band (S801), the terminal device 103 notifies the first base station device 101 of that the terminal device 103 is a terminal device capable of performing NR communication in the first frequency band, using an LTE network (S901). Accordingly, the first base station device 101 can recognize that it is a situation in which NR communication may be performed in the first frequency band. Then, the first base station device 101 turns the MBSFN subframe on (interrupts the transmission of the reference signal for a predetermined period), for example, under a condition that NR communication in the first frequency band is allowed, such as a condition that the usage rate of radio resource by LTE communication is at most a predetermined value. Then, the second base station device 102 is notified of information such as the timing or the cycle of the MBSFN subframe (S804). The following processing is similar to that in FIG. 8. Accordingly, in response to establishment of the connected to the terminal device 103 capable of performing NR communication in the first frequency band, the second base station device 102 can perform NR communication involving synchronization signals and the like, while suppressing the interference with the LTE. The notification in S901 may be a notification on information on the frequency band to which a terminal device that has established NR connection supports, for example. In this case, the first base station device 101 can recognize that it is a situation in which NR communication may be performed in the frequency band (e.g., the first frequency band) to which the terminal device conforms, and perform control such as turning the MBSFN subframe on, as necessary.

As described above, in response to terminal device capable of conforming to NR communication in the first frequency band that is used by LTE being connected to an NR base station device, an LTE base station device interrupts transmission of a reference signal for a predetermined period, in order to allow communication involving NR synchronization signals and the like in the first frequency band to be performed. Accordingly, it is possible to prevent NR signals that are transmitted and received during that predetermined period from interfering with the LTE reference signals. As a result, it is possible to sufficiently decrease the influence of NR interference on LTE communication.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication device capable of performing communication via a second wireless communication system that is different from a first wireless communication system, in a frequency band that is used by the first wireless communication system, the first wireless communication system periodically transmitting a reference signal, the communication device comprising:
    a communication circuit; and
    a controller that controls the communication circuit, wherein
    the communication device is a base station device of the second wireless communication system capable of performing communication via the second wireless communication system in the frequency band, and
    the controller
        controls the communication circuit to transmit, to a base station device of the first wireless communication system, information for operating the base station device in a mode in which the periodical transmission of the reference signal is interrupted for a predetermined period, and
        controls the communication circuit to perform communication involving transmission of a predetermined signal of the second wireless communication system while the base station device of the first wireless communication system is operating in the mode.

2. The communication device according to claim 1, wherein the first wireless communication system conforms to the Long Term Evolution (LTE) standard, and the second wireless communication system conforms to the New Radio Access Technology (NR) standard.

3. The communication device according to claim 2, wherein the mode is a mode in which a multimedia broadcast single frequency network (MBSFN) subframe is on, and
    the predetermined period corresponds to a period in which the MBSFN subframe is on.

4. The communication device according to claim 3, wherein the information further contains an instruction for causing the base station device of the first wireless communication system not to transmit data in the MBSFN subframe.

5. The communication device according to claim 1, wherein the information further contains information indicating a timing to shift the base station device of the first wireless communication system to the mode.

6. The communication device according to claim 1, wherein the controller further controls the communication circuit to transmit, to the base station device of the first wireless communication system, information indicating at least either a cycle or a frequency to shift the base station device of the first wireless communication system to the mode.

7. The communication device according to claim 6, wherein the frequency is set based on the number of terminal devices capable of performing communication via the second wireless communication system in the frequency band.

8. The communication device according to claim 6, wherein the frequency is set based on the number of beams that are used by the communication device in communication in the frequency band.

9. The communication device according to claim 1, wherein the controller controls the communication circuit to transmit the information to the base station device of the first wireless communication system, in response to connection to a terminal device capable of performing communication via the second wireless communication system in the frequency band, in a second frequency band that is different from the frequency band, in a state in which communication via the second wireless communication system in the frequency band is not performed.

10. The communication device according to claim 1, wherein the controller controls the communication circuit to transmit information for interrupting the operation in the mode, to the base station device of the first wireless communication system, in response to cancellation of connection to all terminal devices capable of performing communication via the second wireless communication system in the frequency band.

11. A communication method that is performed by a communication device that is a base station device of a second wireless communication system capable of performing communication via the second wireless communication system that is different from a first wireless communication system, in a frequency band that is used by the first wireless communication system, the first wireless communication system periodically transmitting a reference signal, the communication method comprising:
    transmitting, to a base station device of the first wireless communication system, information for operating the base station device in a mode in which the periodical transmission of the reference signal is interrupted for a predetermined period; and
    performing communication involving transmission of a predetermined signal of the second wireless communication system while the base station device of the first wireless communication system is operating in the mode.

12. A non-transitory computer-readable storage medium that stores a program for causing a computer included in a communication device that is a base station device of a second wireless communication system capable of performing communication via the second wireless communication system that is different from a first wireless communication system, in a frequency band that is used by the first wireless communication system, the first wireless communication system periodically transmitting a reference signal, to execute:
    transmitting, to a base station device of the first wireless communication system, information for operating the base station device in a mode in which the periodical transmission of the reference signal is interrupted for a predetermined period; and
    performing communication involving transmission of a predetermined signal of the second wireless communication system while the base station device of the first wireless communication system is operating in the mode.

* * * * *